(12) United States Patent
Goorjian

(10) Patent No.: US 9,954,613 B1
(45) Date of Patent: Apr. 24, 2018

(54) METHODS AND DEVICES FOR SPACE OPTICAL COMMUNICATIONS USING LASER BEAMS

(71) Applicant: THE UNITED STATES OF AMERICA AS REPRESENTED BY THE ADMINISTRATOR OF NASA, Washington, DC (US)

(72) Inventor: Peter M. Goorjian, Oakland, CA (US)

(73) Assignee: The United States of America as Represented by the Administrator of NASA, Washington, DC (US)

(*) Notice: Subject to any disclaimer, the term of this patent is extended or adjusted under 35 U.S.C. 154(b) by 0 days.

(21) Appl. No.: 15/710,478

(22) Filed: Sep. 20, 2017

Related U.S. Application Data

(63) Continuation-in-part of application No. 14/683,082, filed on Apr. 9, 2015, now Pat. No. 9,774,395.

(60) Provisional application No. 61/986,589, filed on Apr. 30, 2014.

(51) Int. Cl.
| | |
|---|---|
| *H04B 10/112* | (2013.01) |
| *G01J 1/42* | (2006.01) |
| *H04B 10/67* | (2013.01) |
| *H04B 10/118* | (2013.01) |

(52) U.S. Cl.
CPC ........ *H04B 10/1123* (2013.01); *G01J 1/4257* (2013.01); *H04B 10/118* (2013.01); *H04B 10/67* (2013.01)

(58) Field of Classification Search
CPC .. H04B 10/1123; H04B 10/67; H04B 10/118; G01J 1/4257
See application file for complete search history.

(56) References Cited

U.S. PATENT DOCUMENTS

| | | | | |
|---|---|---|---|---|
| 2001/0043381 | A1* | 11/2001 | Green | H04B 10/1123 398/126 |
| 2004/0151504 | A1* | 8/2004 | Triebes | H04B 10/1125 398/131 |
| 2007/0297805 | A1* | 12/2007 | Rabinovich | H04B 10/2587 398/151 |

* cited by examiner

*Primary Examiner* — Leslie Pascal
(74) *Attorney, Agent, or Firm* — Christopher J. Menke; Robert M. Padilla; Mark P. Dvorscak

(57) ABSTRACT

Light is used to communicate between objects separated by a large distance. Light beams are received in a telescopic lens assembly positioned in front of a cat's-eye lens. The light can thereby be received at various angles to be output by the cat's-eye lens to a focal plane of the cat's-eye lens, the position of the light beams upon the focal plane corresponding to the angle of the beam received. Lasers and photodetectors are distributed along this focal plane. A processor receives signals from the photodetectors, and selectively signal lasers positioned proximate the photodetectors detecting light, in order to transmit light encoding data through the cat's-eye lens and also through a telescopic lens back in the direction of the received light beams, which direction corresponds to a location upon the focal plane of the transmitting lasers.

20 Claims, 6 Drawing Sheets

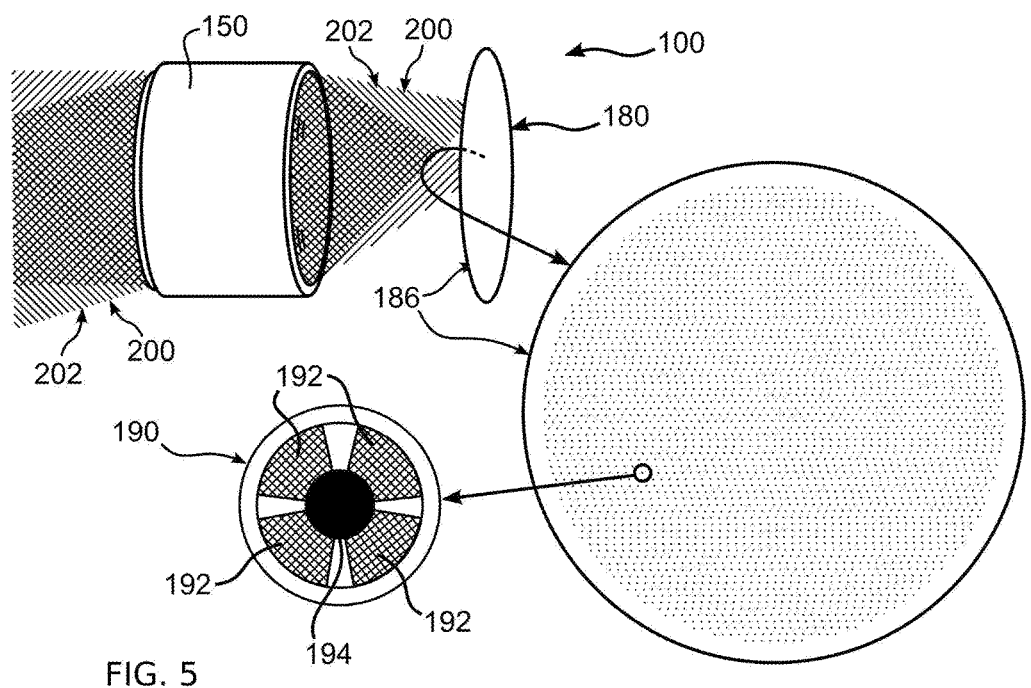
FIG. 5
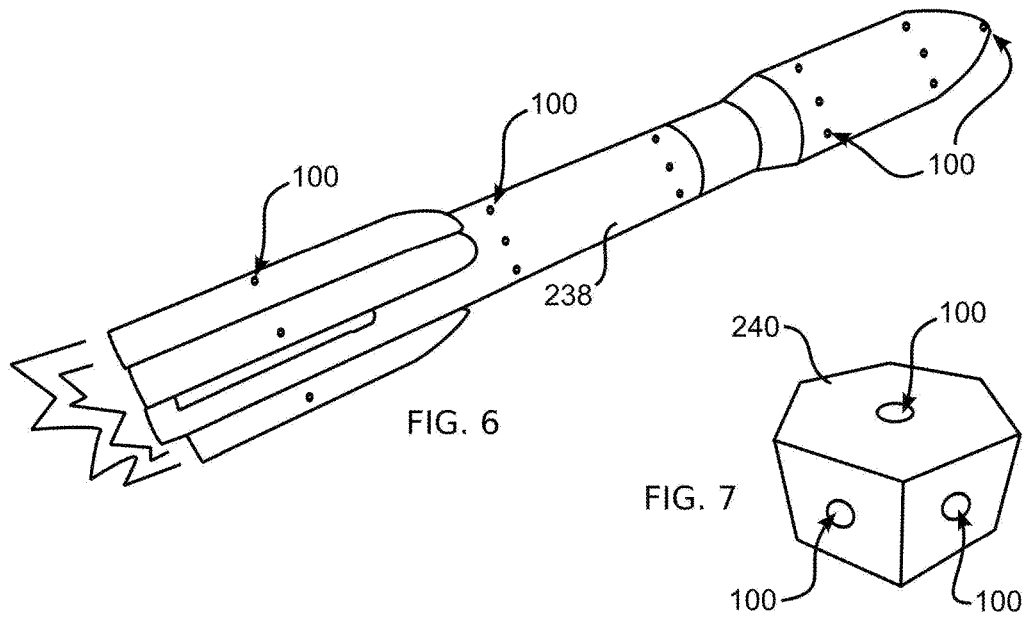
FIG. 6
FIG. 7

US 9,954,613 B1

METHODS AND DEVICES FOR SPACE OPTICAL COMMUNICATIONS USING LASER BEAMS

CROSS-REFERENCE TO RELATED APPLICATION

This application is a continuation-in-part of U.S. patent application Ser. No. 14/683,082 filed Apr. 9, 2015, which claims the benefit of U.S. Provisional Patent Application No. 61/986,589 filed Apr. 30, 2014. The subject matter of these earlier filed applications is hereby incorporated by reference in its entirety.

ORIGIN OF INVENTION

The invention described herein was made by employees of the United States Government and may be manufactured and used by or for the Government of the United States of America for governmental purposes without the payment of any royalties thereon or therefor.

BACKGROUND OF INVENTION

Technical Field of the Invention

The present invention relates to communicating at long distances using lasers, and more particularly to using a telescope, telecentric lens, and lasers for space based communication.

Description of the Prior Art

Modulating Retro-Reflectors are described in Salas et al, IAC-12.B4,6B,11, in which a high-powered laser interrogator beam is directed from the ground to a satellite. Within the satellite, the beam is redirected back to ground using a corner cube reflector. On the satellite, the beam passes through multiple quantum well modulators, which can admit or block passage of the beam to encode a data signal onto the returning beam.

A similar system is described in U.S. Patent Publication 2007/0297805 to Rabinovich et al.

Integration of VCSEL lasers with photodetectors is described in Giannopoulos, et al., Two-dimensional integration of a vertical-cavity surface-emitting laser and photodetectors for position sensing, Applied Optics, Vol. 47, No. 25, September 2008, pp 4555-4559. A VCSEL is positioned in the center of a position sensor, and has photodetectors positioned about the VCSEL.

SUMMARY OF THE INVENTION

In accordance with the disclosure, a method of communicating using light between first and second separated objects comprises receiving laser light beams transmitted from the first object in a telescopic lens assembly of a device connected to the second object, the telescopic lens assembly positioned in front of a cat's-eye lens of the device to thereby transmit the received light to the cat's-eye lens, the light received at any of a plurality of angles and output through the cat's-eye lens to a focal plane of the cat's-eye lens, the position of the light beams upon the focal plane of the cat's-eye lens corresponding to the angle of the beam received at the cat's-eye lens, the device further including a plurality of lasers distributed upon a supporting surface connected to the lens to be positioned along the focal plane, the plurality of lasers thereby distributed along the focal plane, and a plurality of photodetectors distributed upon the supporting surface with individual ones of the plurality of photodetectors positioned proximate individual lasers, the photodetectors configured to detect the received light beams upon the focal plane; using a processor to receive a signal from individual ones of the plurality of photodetectors corresponding to light beams detected, selectively signal individual ones of the plurality of lasers positioned proximate the individual ones of the photodetectors detecting light, the signal operative to cause the selected lasers to transmit light encoding data through the cat's-eye lens and telescopic lens in a direction of the first object at an angle corresponding to a location upon the focal plane of the individual ones of the plurality of lasers transmitting the light encoding data.

In variations thereof, individual ones of the plurality of lasers are VCSEL type lasers; the lens is a telecentric lens; the method further includes multiplexing the light encoding data emitted from a plurality of selected lasers to form a common data stream; the telescopic lens assembly is one of a refractive and reflective type telescopic lens assembly; the method further includes encoding the light encoded data at a rate of more than about 1 GHz; and/or one of the first and second objects is a satellite.

In further variations thereof, the cat's-eye lens includes a Plössl type lens assembly; a micro-lens assembly is positioned between the cat's-eye lens and the focal plane; the micro-lens assembly directs light from individual ones of the plurality of lens to the vertex of the cat's-eye lens; the photodetectors and the lasers are provided in the form of a manufactured wafer having at least 7 lasers; and/or the plurality of lasers, the cat's-eye lens, and the telescope are cooperative to transmit laser light out of the telescope at an angle between 0° and at least 1°.

Further in accordance with the disclosure, a method of communicating using light between first and second separated objects separated by an astronomical distance being at least as great as the distance from the surface of Earth to LEO, the distance between two satellites, or the distance from Earth to a spacecraft in flight, comprises receiving laser light beams transmitted from the first object in a telescopic lens assembly of a device connected to the second object, the telescopic lens assembly positioned in front of a cat's-eye lens of the device to thereby transmit the received light to the cat's-eye lens, the light received at any of a plurality of angles and output through the cat's-eye lens to a focal plane of the cat's-eye lens, the position of the light beams upon the focal plane of the cat's-eye lens corresponding to the angle of the beam received at the cat's-eye lens, the device further including a plurality of lasers and photodetectors distributed upon a supporting surface connected to the lens to be positioned along the focal plane, the plurality of lasers and photodetectors thereby distributed along the focal plane, and using a processor to receive a signal from individual ones of the plurality of photodetectors corresponding to light beams detected, selectively signal individual ones of the plurality of lasers positioned proximate the individual ones of the photodetectors detecting light, the signal operative to cause the selected lasers to transmit light encoding data through the cat's-eye lens and telescopic lens in a direction of the first object at an angle corresponding to a location upon the focal plane of the individual ones of the plurality of lasers transmitting the light encoding data.

In variations thereof, the lens is configured to receive laser light beams transmitted from the Earth to Space; at least one of the first and second objects is a satellite; the cat's-eye lens is a Plössl type lens assembly; individual ones of the plurality of lasers are VCSEL type lasers; and/or the cat's-eye lens has a FOV of at least 42°.

In an embodiment of the disclosure, a device for communicating using light between first and second separated objects comprises a satellite; and a device affixed to the satellite, including: a telescopic lens assembly; a cat's-eye lens positioned behind the telescopic lens assembly; a plurality of lasers distributed upon a supporting surface positioned along a focal plane of the cat's-eye lens; and a plurality of photodetectors distributed upon the supporting surface to position individual photodetectors upon the focal plane proximate individual lasers.

In a variation thereof, the device further includes at least one of a Plössl type lens assembly and a holographic optical element exhibiting the optical characteristics of a Plössl type lens assembly.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 depicts a perspective view of a system 100 of the disclosure, and a detail of a panel positioned along the focal plane of a telecentric lens of the system, and a further detail of a photodetector and lens subassembly located among many other such subassemblies upon the panel;

FIG. 6 depicts a plurality of systems 100 of the disclosure positioned about an external surface of a launch vehicle; and FIG. 7 depicts a plurality of systems 100 of the disclosure positioned about an external surface of a satellite;

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The figures herein are drawn for ease of understanding, and are not drawn to scale or proportion.

The disclosure provides a system and method for improving communications over long distances, for example from astronomical objects to an object in orbit; between objects in various orbits; between astronomical objects and between any objects separated by an astronomical distance, for example, between objects separated by a distance that is as great as the distance from the surface of Earth to LEO, or between objects that are separating from each other at high speed.

In particular, communication is improved using optical communications in space, including for example communications from the Earth to spacecraft in Earth orbit, or objects in deep space, such as at the moon and Mars, and between objects in Low Earth Orbit (LEO) and objects at a Geosynchronous Orbit (GEO), or a Geostationary Earth Orbit, which can be at a relatively much higher altitude than LEO.

Figure 1:
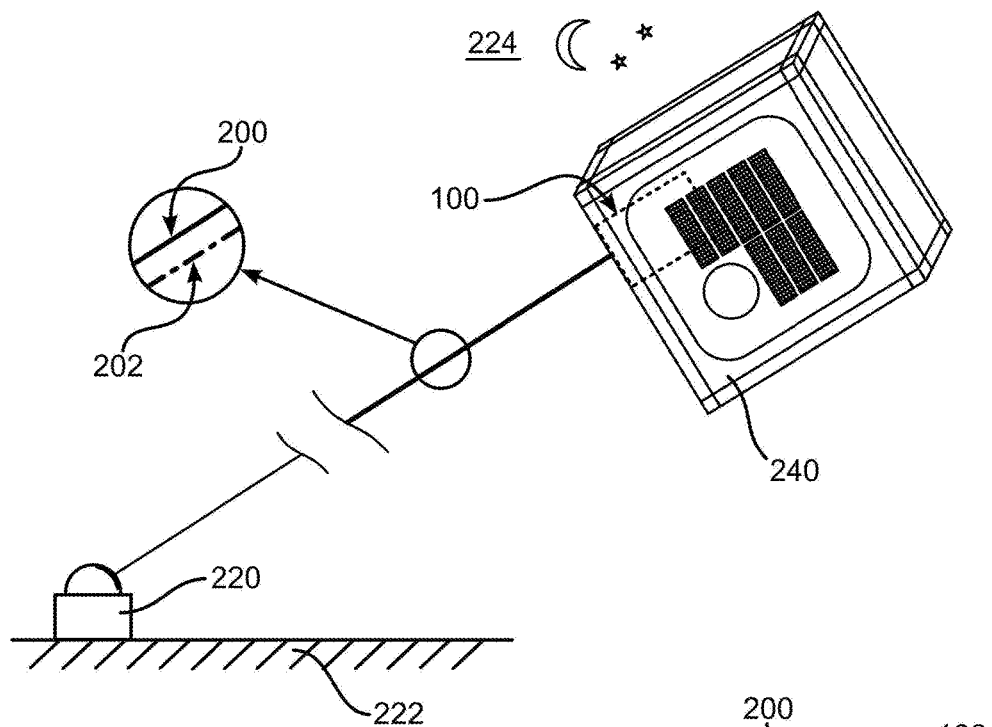
FIG. 1 depicts a satellite incorporating a system 100 of the disclosure, for communicating using laser beams sent from the Earth, and from the satellite, in accordance with the disclosure.
Figure 2:
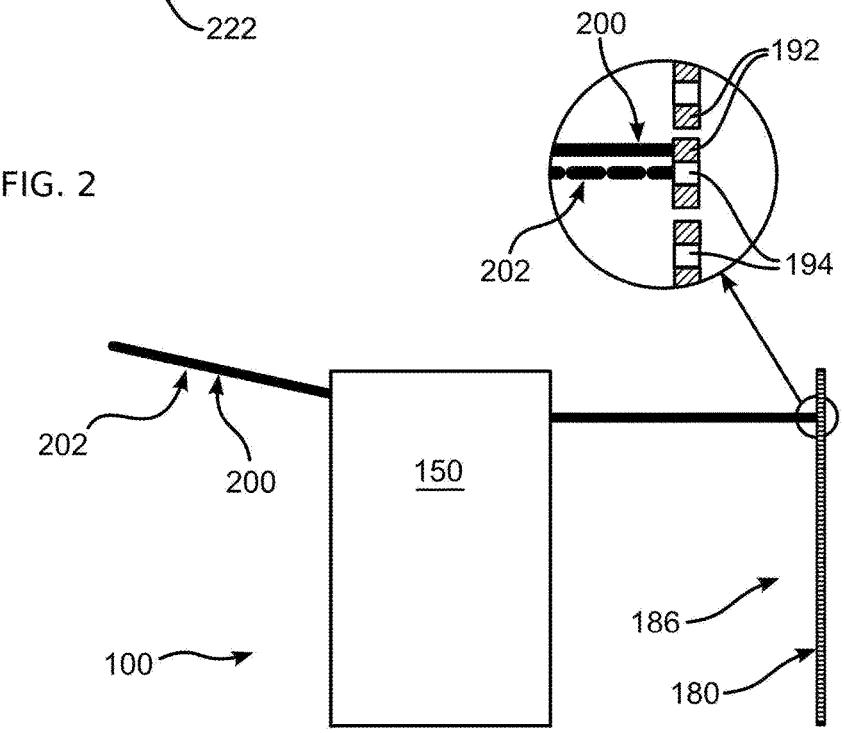
FIG. 2 depicts a schematic view of a beam of light passing from a source through a telecentric lens, and from a laser positioned on a focal plane of the lens passing through the lens and to the source, in accordance with the disclosure.

The disclosure includes a laser beam pointing technology that can be advantageously used aboard spacecraft with very limited amounts of available energy and physical space. With reference to FIGS. 1-2, a system 100 can detect a signal laser beam 200 and can then return a modulated laser beam 202 to the source, for example to a ground terminal 220 on the Earth 222, or to a satellite 240, or other object at a great distance in space 224. System 100 can replace methods that use either a laser together with a Pointing, Acquisition and Tracking (PAT) procedure which repositions a spacecraft, or a powerful ground-based laser cooperative with a retroreflector in the spacecraft.

In FIG. 1, system 100 is mounted upon or within a satellite 240. In the example shown, a CubeSat is illustrated, although any form of object in space can be considered in the context of the example. Notwithstanding the foregoing, given that a CubeSat displaces only one liter, that particular example does emphasize that system 100 can have a small size, and use a very small amount of energy, as discussed elsewhere herein.

Figure 3:
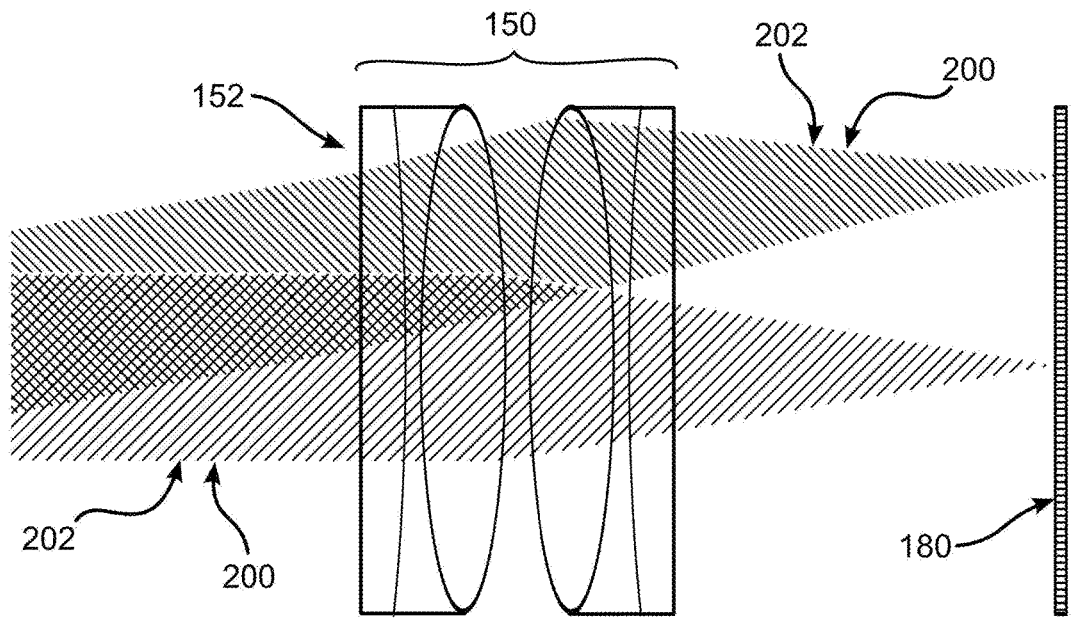
FIG. 3 depicts an embodiment of a telecentric optical device formed from lenses, incorporated within a system 100 of the disclosure, further illustrating beam paths through the lens.
Figure 4:
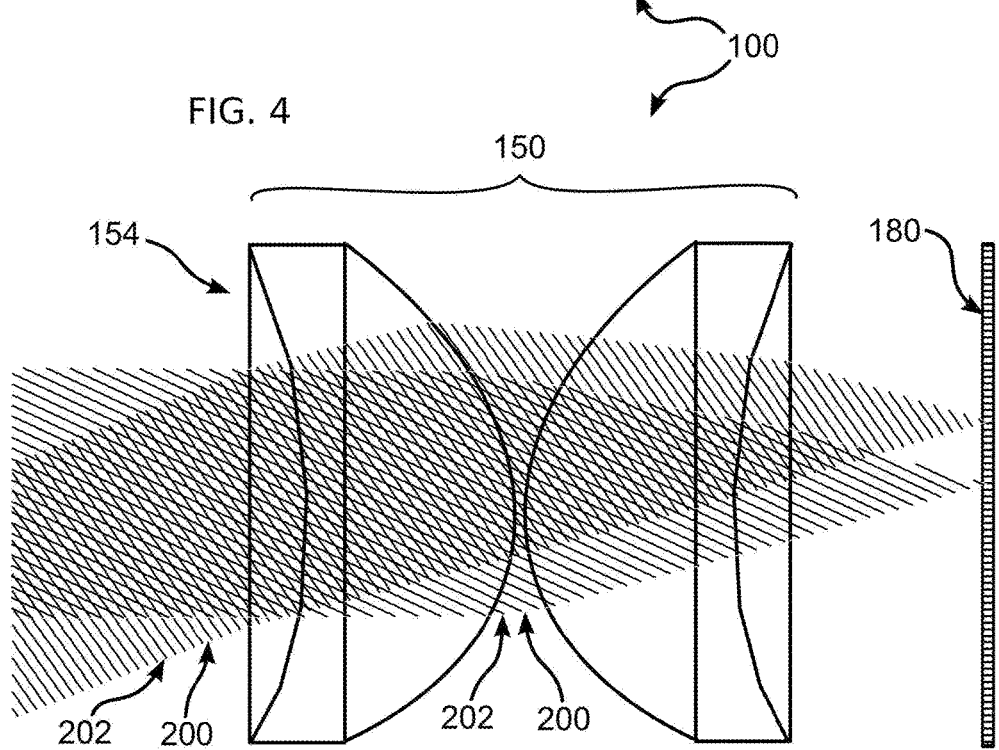
FIG. 4 depicts an alternative lens configuration within an optical device of the disclosure.

System 100 is illustrated in greater detail in FIG. 2, wherein a solid line diagrammatically represents a locking beam 200 generated by an interrogating source laser, and a data beam 202, respectively, returned from system 100 through optical device 150. As described elsewhere herein, it should be understood that locking beam 200 can additionally encode transmitted data. The rays are adjacent due to properties of optical device 150 which causes retro-reflection of an inbound beam 200 by producing, over the effective Field of View (FOV) of device 150, a symmetric ray bundle in the focal plane regardless of the input angle of the beam. In accordance with the disclosure, this can be accomplished by any known or hereinafter developed means. In an embodiment, device 150 is a telecentric cat's-eye lens as shown and described, for example, in U.S. Patent Publication 2007/0297805 to Rabinovich et al., or in Rabinovich et al., IEEE Photonics Technology Letters, Vol. 15, No. 3, March 2003, the contents of each of which are incorporated herein by reference. The cat's-eye telecentric lens of these references, most essentially, functions like a cat's-eye lens in that it reflects light back in the angular direction from which it came, but instead of using a hemispherical mirror, a planar mirror is used. In an embodiment, the telecentric lens is a double telecentric lens, as shown in FIGS. 3-4.

The instant invention exploits the ability of this type of telecentric lens, or any other device with these properties, of being able to return inbound light at the angle from which it was received, by reflection from a planar surface. More particularly, in accordance with the disclosure, one or more photodetectors 192 are associated with one or more lasers 194, or other source of collimated light (hereinafter laser), which can be electrically triggered in response to light detected by the photodetector 192. The photodetector and associated laser are positioned upon a plane 180 defined by the focal plane of device 150.

When inbound light strikes the photodetector, an electrical signal of the photodetector causes generation of an outbound beam of collimated light by laser 194. In an embodiment, an electronic device, for example a computer processor 1105, receives the electrical signal from the photodetector and accordingly sends a modulated or data encoded signal to laser 194, which produces a modulated or data encoded beam which is transmitted back through device 150 at the inbound angle, to an area that includes the original source of the inbound beam. It is advantageous for the outbound beam to be collimated, so that the beam will have sufficient concentration and strength to be detectable after traveling a large distance, for example between a device in orbit or space and a device on a planetary body, between orbiting devices or devices in space, or between devices upon different astronomical objects/ground stations.

It is a property of device 150 that beams entering device 150 orthogonal to the focal plane and plane 180 will be directed to the center of the focal plane, and therefore to a center of plane 180. As light enters device 150 at an angle offset with respect to an angle orthogonal to the focal plane, such light will be directed to a position on plane 180 that is relatively more offset from a center of the focal plane and plane 180 as the angle increases. In accordance with the disclosure, light generated at such an offset location is caused to leave device 150 at an angle corresponding to the angle of this inbound light. In this manner, the disclosure can function like a cat's-eye telecentric lens.

FIGS. 3 and 4 illustrate alternative embodiments of optical device 150, each including an assembly of optical lenses. In FIG. 3, optical device 150 includes a lens assembly 152, such as is shown and described in U.S. Patent Publication 2007/0297805 to Rabinovich, et al., the contents of which are incorporated herein by reference. Two inbound/outbound examples of beams 200, 202 are illustrated, demonstrating that beams orthogonal to plane 180, within the lower shaded example area, will be directed to the center of the focal plane 180, and beams entering at an angle, within the upper shaded example area, will be directed to a position offset from the center of the focal plane 180. Likewise, due to the properties of optical device 150, light leaving from the center of plane 180, generated by a laser 194, will leave optical device 150 orthogonal to plane 180, and light leaving from offset from the center of plane 180, generated by a different laser 194, will leave optical device 150 at an angle corresponding to the distance the laser 194 is offset from a center of the focal plane 180. FIG. 4 illustrates the same principle, but using a lens assembly 154 such as is as shown and described in Rabinovich, et al., Free-Space Laser Communication Technologies XV, G. Stephen Mecherle, Editor, Proceedings of SPIE Vol. 4975 (2003), the contents of which is incorporated by reference herein.

In an embodiment, a laser 194 is associated with one or more photodetectors 192, and a field of such laser/photodetectors combinations is distributed across the focal plane of device 150 upon plane 180. To provide a sufficiently small, a power laser, for example a vertical-cavity surface-emitting laser (VCSEL) can be used. These can be low power, for example about 1 mW, or high power, for example about 1 W, and are currently available up to 5 W, or in arrays which can be in the range of a kilowatt or more. These can be assembled together with photodetectors, ideally a VCSEL and its associate photodetector are in close proximity, so that the outbound beam produced by the VCSEL arrives at the location of the inbound beam, at a location of a detector proximate the source of the inbound beam 200. A subassembly of a laser 194 and associated photodetectors 192, which are manufactured in arrays, is shown and described, for example, in Giannopoulos et al, Applied Optics, Vol. 47, No. 25, September 2008, pp 4555-4559, the contents of which are incorporated herein by reference.

With reference to FIG. 5, a detector/laser panel array 186 includes numerous detector/laser subassemblies 190, for example of the type described in Giannopoulos, or as may hereafter be developed. In an embodiment, the photodetectors 192 are PIN photodetectors, although other types can be used, including for example MSM or RCPD types, or other known or hereinafter developed type of photodetector. A laser 194 is positioned proximate the photodetectors 192, in the example shown, in a center surrounded by four photodetectors 192. It should be understood that there may be any number of lasers 194 proximate any number of photodetectors 192, and that such combinations can operate together, the one or more lasers 194 emitting in response to one or more of the photodetectors 192 detecting inbound light. Alternatively, a computer processor 1105 can associate detectors 192 and laser 194 by executing software which selects combinations advantageous to a particular application. Other configurations are illustrated in Giannopoulos, and may exist or be hereafter developed.

In an embodiment, there are thousands of detector/laser subassemblies 190 positioned upon the focal plane 180, each connected to an electronic processor 1105. A determination of the quantity of subassemblies, and their distribution upon plane 180, is dependent upon a particular application of the disclosure, and is based upon beam strength, a distance between systems 100, available power and space, cost, and other factors. In an embodiment, subassemblies are manufactured as an integrated wafer. In an embodiment, a VCSEL has a diameter of one micrometer, and photodetectors are currently available at a similar size, enabling a subassembly 190 that is quite small relative to the range of apertures of optical device 150. It should be understood that larger lasers can be used, for example VCSELs or other laser type that is less than 10 micrometers, or larger than 10 micrometers.

In an embodiment, not shown, one or more subassemblies 190 are moveable upon plane 180. In this manner, a single subassembly 190 can be used, or a lesser number of subassemblies 190. Movement can have based upon instructions from a processor 1105, and can be carried out by any of electromechanical means, shape memory alloys, or any other known or hereinafter developed means. Alternatively, plane 180 can be moved.

The diameter of the lens of optical device 150 can be, for example, 10 cm, and thus stationary objects, and objects which are moving on a predictable path, are easily targeted at great distances using known techniques. Device 150 can have a substantially smaller lens diameter, for example less than a centimeter, or substantially larger than 10 cm, for example 40 centimeters or more. A size of device 150 is determined in part by an intended use, and may be limited by factors such as weight, cost, and energy requirements. The size of panel array 186 corresponds to the lens design of device 150.

VCSELs can be highly energy efficient, and can operate, for example, in the milliwatt range, making them advantageous for satellites and other vessels operating within a very limited energy budget. Lasers with higher energy requirements, and which can generate a stronger signal, can be positioned upon an astronomical object, such as the Earth or its moon, where greater energy, weight, and dimensional resources may be available. Similarly, more sensitive instruments can be made available for reliably detecting the light emitted from a single VCSEL. Further, VCSELs can advantageously be operated at a wavelength of 1,550 nanometers, which is deemed safe for human eyes within the power ranges needed for light based communications in accordance with the disclosure. Additionally, equipment for detecting and transmitting light at 1,550 nanometers currently exists, facilitating implementation of the disclosure. In an embodiment, the light emitted from a single laser 194 element is 10 to the $8^{th}$ power greater than the inbound beam. In a further embodiment, multiple lasers 194 can be illuminated simultaneously to increase the strength of an outbound beam.

In some applications, an inbound beam may have diverged, or may otherwise illuminate a plurality of photodetectors 192.

In use, a signal in the form of an inbound beam of light, typically collimated light, is directed towards system 100 with sufficient precision to enter device 150, wherein symmetrical or parallel ray bundles are directed to the focal plane 180 and panel array 186. One or more photodetectors 192 detect the inbound light, and signal to an electronic processor 1105 to activate one or more associated lasers 194 to generate an output beam which is caused to leave optical device 150 at the same angle as the inbound beam of light. Accordingly, the outbound beam of light can be detected at the location of the source of the inbound beam of light. The processor can modulate the one or more lasers 194 to encode data by switching lasers 194 on and off at a desired frequency. This pattern of on and off can be detected at the destination, and the encoded data can thereby be obtained. VCSELs are currently capable of switching on and off at a rate of substantially more than 1 gigahertz, thereby enabling the transmission of relatively larger amounts of data than is possible using other devices and methods. It should be understood that lower frequencies can be used, for example of 100 MHz or less, or between 100 MHz and 1 GHz, to conserve power or for any other reason, and can receive or transmit at any other frequency that may be useful, for example to communicate with systems not capable of higher frequencies. It should further be understood that lasers can be used in accordance with the disclosure that have not yet been produced, and which can switch at data rates far higher than 1 GHz.

It is typical for a projected beam to be caused to jitter or waver due to vibration or movement of any or all of the structure supporting the source of the beam, interference experienced by the beam between its source and destination, for example in the atmosphere, and movement of the destination structure. As such, using prior art methods, lasers at the space terminals must be pointed extremely accurately at the ground terminal receivers. More particularly, a pointing, acquisition and tracking (PAT) procedure is often used to point a laser beam to a ground terminal receiver. PAT procedures are complicated, and require moving parts such as fast steering mirrors or gimbals, vibration isolation platforms, and a significant power budget. In accordance with the disclosure, such systems are not required.

More particularly, System 100 can compensate for such movement. As a wavering inbound beam 200 moves from illuminating a given photodetector 192 or set of associated photodetectors 192, it can be detected by an adjacent set of photodetectors 192, and a laser 194 associated with the adjacent set of photodetectors 192 can resume transmitting the interrupted data stream.

FIG. 5 further illustrates two inbound beams 200, and two returning encoded beams 202. In accordance with the disclosure, any number of subassemblies 190 can be used to each generate an independent communication link to either a common or different source objects. Likewise, a plurality of subassemblies 190 can be coordinated to produce separate data streams which are combined at the destination to generate one correspondingly larger set of common data, for example using wavelength division multiplexing. In this manner, the overall bandwidth of system 100 can be greatly increased. Such combined signals can be established with multiple targets. In this manner, system 100 can operate as a relay, for example between the Earth, LEO objects, GEO objects, objects in deep space, and/or other astronomical objects, such as planets, moons, or asteroids.

In FIG. 6, in place of, or in addition to, radio frequency communication methods, one or more systems 100 can be positioned about an exterior surface of a rocket or launch vehicle 238. If sufficient systems 100 are deployed, it can be possible to maintain communication with another object in the unlikely event of unplanned or uncontrolled movement of vehicle 238 during its flight. A system 100 can be placed in a minimum of locations about an exterior of a vehicle 240, or other object, so that regardless of an orientation of the object, a line of sight may be established with a particular source location. Determining the number of systems 100 can include consideration of the maximum angle of inbound beams relative to an axis of device 150 at which optical device 150 can bundle inbound beams onto the focal plane 180.

In FIG. 7, multiple systems 100 are illustrated disposed about an exterior surface of a multifaceted satellite 240. In this manner, satellite 240 can relay communication to multiple targets simultaneously using multiple systems 100, without requiring reorientation of satellite 240. Additionally, in a similar manner to FIG. 6, if such a satellite should be caused to tumble or otherwise dispose any one system 100 out of alignment with a source signal 200, another system 100 will become aligned, and may resume communications. During such tumbling, it can be determined which system 100 will become aligned next, due to the transmission of data which encodes the progressive identities of subassemblies 190 which are activated, each of which has a known location upon the satellite 240.

In an embodiment of the disclosure, an inbound laser beam 200 can function either as a beacon beam, to correlate with a returning beam 202 as described elsewhere herein, or can function to encode data, as well. Data can be encoded in any known manner, including modulation of beam strength, or modulation of the beam 200 output. For modulation of beam strength, an electronic processor 1105 connected to the photodetectors 192 can be programmed to identify that a greater and lesser number of photodetectors 192 are triggered alternately, as the beam strength is modulated.

The disclosure provides a system 100 of significant reliability, as the optical device 150, photodetectors 192, and lasers 194 all operate without moving parts. Further these components do not normally require maintenance. The disclosure provides an additional advantage, in that an inbound laser beam does not have to be sufficiently strong to reflect a signal back to the source, as is required when using prior art retro-reflectors, which can require beams in the kilowatt range. Moreover, these high-powered beams typically operate at a wavelength of 1064 nm, which can damage human eyes, and which is not a standard communication wavelength that is widely adopted. Still further, these beams are sufficiently powerful to subject the returning reflected beam to atmospheric backscatter from the forward beam, reducing signal quality. As the disclosure provides its own separate returning beam, a substantially weaker inbound beam can be used, and problems of backscatter can be avoided.

The disclosure can augment systems that only use a spacecraft ADCS (attitude determination and control system), saving power, while avoiding interruptions in the mission. The disclosure can also augment beaconless systems, for example of the type which use star tracking as part of an ADCS pointing system, instead of a beacon laser beam from a ground terminal.

The divergence of outbound beam 202 can be changed by changing a diameter of a lens system or by changing the location of the plane of the laser array in relationship to the focal plane of the lens system in optical device 150. The accuracy of the direction of the outbound beam can be determined, for example, by the particular design of a lens system within device 150. An increased, or more fine resolution of detection can be obtained by increasing a size of a lens system within optical device 150. For Low Earth Orbit applications, a power output on the order of one mW is expected to be sufficient for a VCSEL in a subassembly 190.

As discussed elsewhere herein, system 100 can compensate for movement by establishing communication using at least two adjacent photodetectors 192 and lasers 194. As a wavering or moving inbound beam 200 changes from illuminating a given photodetector 192 or set of associated photodetectors 192, a signal can be detected by an adjacent set of photodetector 192 and laser 194, which can maintain the data stream. However, as the distance to the receiver or ground terminals increase, two adjacent outbound beams may ultimately not overlap, for reasons described below.

Accordingly, in an embodiment of the disclosure, optical device 150 includes a telescope lens system 154 positioned in front of the cat's-eye lens assembly 152, which serves to reduce the angle of the outbound beam to more closely align its outward direction with the axis of the optical device 150, and accordingly, ensuring that there is overlap between adjacent outbound beams to maintain continuous communication.

Figure 9:
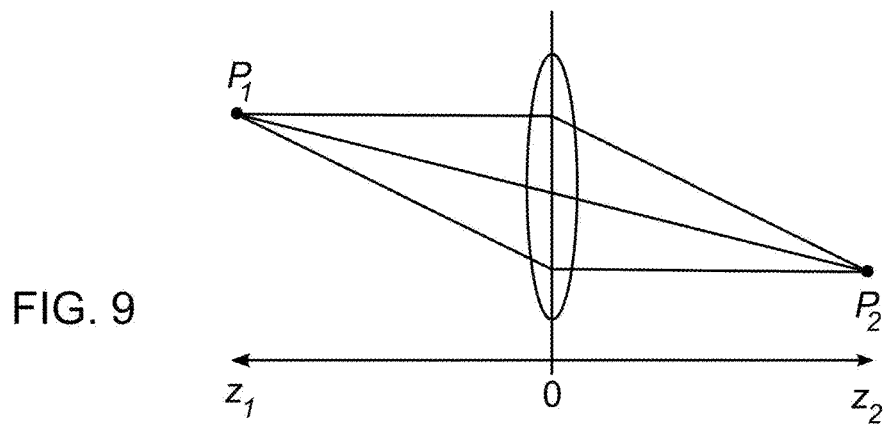
FIG. 9 is a PRIOR ART illustration of optic theory.

Although the disclosure is not bound to any particular theory, the problem of angular separation of the beams can be understood with reference to FIG. 9, in which a simple thin lens system is depicted. As shown in FIG. 9, all rays originating from a point $P_1=(y_1, z_1)$ meet at a point $P_2=(y_2, z_2)$, according to the formula $y_2=-(z_2/z_1) y_1$. Extrapolating this formula to system 100: where $z_1=100$ mm$=10^{-1}$ m, which is an example focal length of a cat's-eye lens usable with the disclosure, $z=500$ km$=5\times 10^5$ m, which is the distance to the Earth of a satellite in LEO, and $y_1=100$ um$=1\times 10^{-4}$ m, which is the pitch (distance) between VCSELs in the laser array, then $y_2=-(z_2/z_1)y_1=-5(10^3)$m, so $-y_2=5(10^2)$m is the distance between laser beams at ground terminal 220. The distance $y_2$ is about 100 times larger than a desired laser beam spot size of 5 m. However, this distance can be reduced, for example by a factor of 100, by the use of telescope configuration 154. This reduction will result in the two laser beams overlapping at the ground receiver, which will ensure that the receiver on the ground will maintain continuous reception of the communication as the satellite moves overhead. The movement of the satellite causes the location of a laser spot arriving on the Earth to move so that the receiver will move out of the field of the spot. With the overlapping beams of the disclosure, the receiver will move out of one spot and into another spot, remaining continuously within the projected spot of at least one beam.

Figure 10:
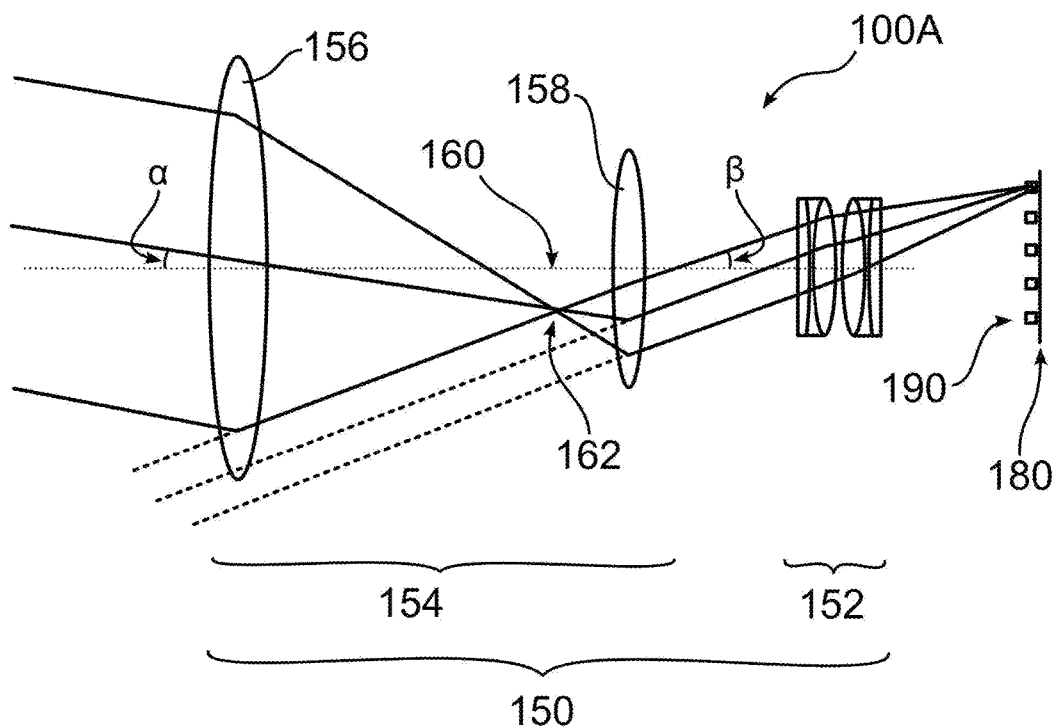
FIG. 10 depicts a device of the disclosure, including a telescopic lens assembly.

FIG. 10 illustrates system 100A which includes a telescope 154, diagrammatically illustrated as including an objective lens 156 and an eyepiece 158, either of which can include multiple lenses. However, it should be understood that in addition to the Keplerian type telescope illustrated in FIG. 10, other types of telescope configurations can be used in this manner, as would be understood within the art. Such variations include, for example, Galilean types, achromatic and apochromatic refractors, as well as reflector type telescope configurations, such as Newtonian and Dobsonian reflectors, and hybrid types, such as compound or catadioptric types. In each such configuration, the cat's-eye lens is positioned as would be a lens of the human eye, the eyepiece 158 being therefore focused with respect to cat's-eye lens assembly 152. System 100A can advantageously be used in both ground terminal 220 and in space.

Considering further the eyepiece, or lens assembly 152, as additionally described elsewhere herein, a laser beam is transmitted outward from a laser element 194 of a laser array that is located at the focal plane of the cat's-eye lens 152. The direction of propagation of the laser light is determined by the location of the laser in the array. The outbound laser beam leaves the cat's-eye lens 152 and passes through eyepiece 158, whereupon the laser beam is refocused to a location that is a smaller distance from the central axis of eyepiece 158, which is also the central axis of the cat's-eye lens. Since it is now closer to the central axis, it will be transmitted out by objective lens 156 in a direction that is closer to the direction of the vertex, i.e. at a smaller angle, designated as angle α in FIG. 10, than when it left the cat's eye lens, designated as angle β. With commercial objective and eyepiece lens, this angle can be reduced by a hundred times or more, for example, in a practical design.

For a distance $f_0=360$ mm, $f_e=3.6$ mm, the magnification $M=-f_0/f_e=-100$. Eyepieces with $f_e=3.6$ mm can be used, and an objective lens with $f_0=36$-mm is similarly readily available and suitable, for used in telescopes 154 positioned within system 100A within a satellite. This particular ratio of focal lengths for the eyepiece and objective lenses is merely illustrative, and it should be understood that focal ratios can be selected, as understood within the art, to achieve the objective of forming an external angle α with respect to a line passing through the vertex 160 which is smaller than an internal angle β, while passing sufficient light and meeting other criteria in terms of desirable quality. This enables a relatively smaller offset between two adjacent beams than if telescope 154 were not present. Using the example focal ratios above, the angular separation is reduced by a factor of 100, to $y_2$ of 5 m.

As system 100A must be packaged for installation in a satellite or other small object, its overall length is significant. Accordingly, the introduction of telescope 154 can cause an increase in length which is advantageously minimized. A length of system 100, in one example configuration, can be calculated as approximately $L=z_1+f_e+f_0=100$ mm+3.6 mm+360 mm=463.6 mm. The length L can be reduced by making the lengths $Z_1$ and $f_e$ about equal, since their product determines the distance $y_2$. For example, if $z_1=200$ mm and $f_0=180$ mm, then $z_1*f_0=3.6\times10^4$ mm and $y_2=5$ m, as before, but $L=z_1+f_e+f_0=200$ mm+3.6 mm+180 mm=383.6 mm, which is a reduction of 80 mm.

The length of system 100A can be reduced even further by using two or more telescope lens system in series, since the total magnification of the complete system is equal to the product of the separate magnifications. For example, with $Z_1=100$ mm, if two telescope lens systems, $S_1$ and $S_2$, were used in series and $f_o=36$ mm, $f_e=3.6$ mm for both telescope lens systems, then their magnifications, $M1=M2=f_0/f_e=-10$, and $Y_2=[(1/M)^2]*[-(z_2/z_1)*y_1]=[(-f_e/f_0)^2]*[-(z_2/z_1)*y_1]=[-(1/10)^2]*[-5\times10^2 \text{ m}]=-5$ m, and the distance between beam centers is the same as before, namely 5 m, and $L=z_1+2*(f_e+f_0)=100$ mm+2*(3.6 mm+36) mm=179.2 mm, which is a reduction of 284.4 mm from the initial system above, which uses just one telescope lens system.

An additional manner of reducing the length of the system is to use an eyepiece that has a smaller focal length then $f_e=3.6$ mm. That length is taken from a commercially available eyepiece that is designed for use with the human eye. However, system 100/100A uses a laser array in the focal plane of a cat's eye lens system, as opposed to a human eye with a retina in the focal plane of the lens of the eye. Since the laser array can be, advantageously, millimeters in size, as opposed to the human eye system which is substantially larger, it may be possible to use a smaller lens for the eyepiece lens. Accordingly, the complete system of lenses 150 would be reduced in size and focal lengths.

A still further manner of reducing the length of system 100/100A is to use a cat's eye lens that has a smaller focal length then $z_1=100$ mm; again, because the laser array is millimeters in size.

The inclusion of diffractive effects does not alter the analysis of the system in a significant way. More particularly, with reference to FIG. 10, rays would not focus at a point in the focal plane that is common to the objective and eyepiece lens; rather they would form a narrowed area 162 that is determined by the diffraction limit of the converging beam of rays. However, the beam would continue in the manner that is determined by ray optics, including direction. In passing through a lens element the spread of the beam would be far from the diffraction limit, so that the propagation would be determined by ray optics, as can be seen in FIG. 10.

Figure 11:
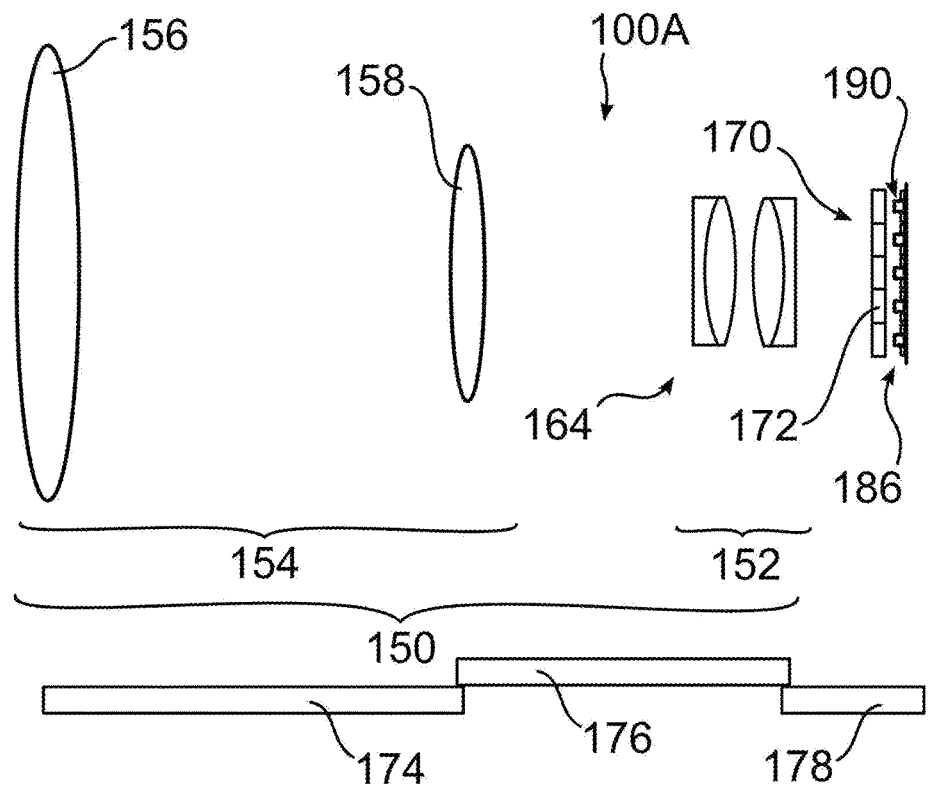
FIG. 11 depicts a device of the disclosure, including a telescopic lens assembly and a Plossl type lens assembly.
Figure 12:
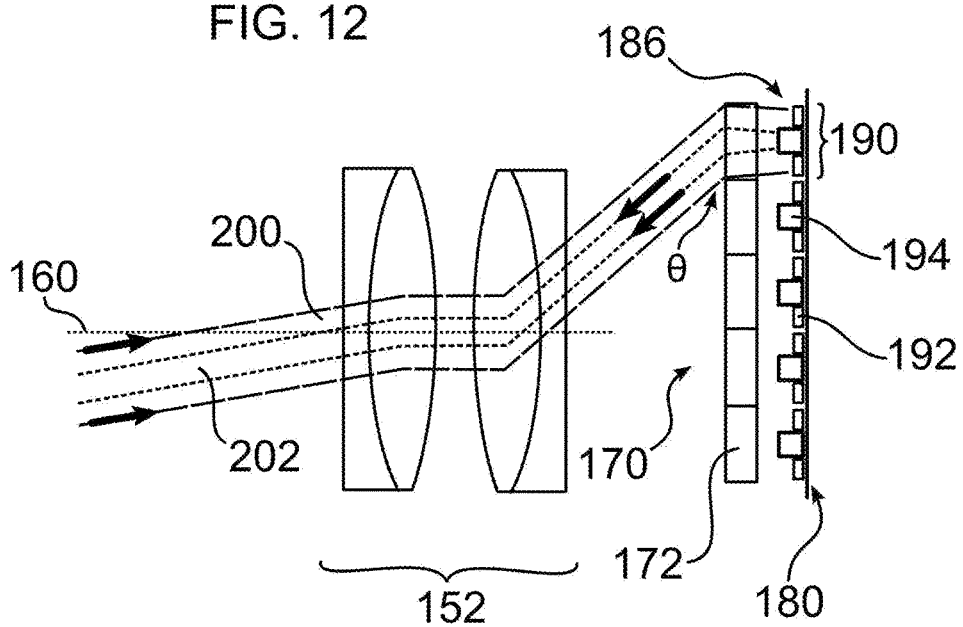
FIG. 12 depicts a detail of the device of FIG. 11, including example ray paths.

With reference to FIGS. 11-12, a micro-lens array 170 is positioned in front of the array of photodetector 192/laser 194 subassemblies 190. The individual lenses of micro-lens array 170 are each formed and/or positioned to focus the output of a laser 194 toward the vertex of lens assembly 152, and to capture inbound light at a predetermined angle and focus the light on an adjacent photodetector 192.

By pointing each laser beam to the vertex, the inventor has found that the beam emerging from the optic device 150 forms a high-quality collimated beam. In addition, using micro-lenses to point the outbound laser beams from the lasers to the vertex of the lens system allows for the use of a larger array of lasers. This increase in size of the array, in turn, allows for a wider field of view, so that a larger area of the Earth, or other target, can be covered by the telescope.

As additionally illustrated in FIGS. 11-12, lens assembly 152 can in particular include a diffraction-limited cat's-eye lens system such as a Plössl type lens 164, which includes two, typically achromatic, lens doublets placed back to back, as diagrammatically shown in FIGS. 11-12. The doublets can be symmetrical or asymmetrical. A compound Plössl lens 164 provides a large apparent field of view, which can be 50° or more. Plössl lens 164 further has the characteristic of a short eye relief, which can contribute to an overall shorter system 150 length. The Plössl lens has additionally been found by the inventor to perform well at gathering light from lasers 194, which may be very small, and which can typically have a divergence θ (half-angle) of about 4° to 8°. A Plössl or other wide FOV cat's-eye lens can be replaced by a holographic optical element as currently understood or as hereinafter developed, which would reduce weight and cost.

In accordance with the disclosure, the inventor has found that beams of lasers 194 positioned off-axis, or away from the vertex, can be directed towards the vertex, resulting in improved results. While individual lasers 194 can be repositioned to carry this out, further in accordance with the disclosure, and with reference to FIGS. 11-12, a micro-lens array 170 is used to point laser beams of lasers 194 toward the vertex. Micro-lens 170 is further combined with an eyepiece 152 having a wide apparent field of view, to enable a greater field of view of optical device 150, advantageously resulting in total angle α being at least 1°. The Plössl lens system has a short focal length relative to other lens systems, so it can readily include all of the typical 8° (half angle) divergence of laser beam 194. It typically has a relatively large FOV of about 42° (full angle) or more, facilitating the mapping to a photodetector 192 of an inbound beam 200.

Accordingly, each of micro-lens array 170 and cat's-eye lens system 152, such as the Plössl lens system, with a wide FOV, contribute to enable a detector/laser panel array 186 of limited size to cover a much wider FOV (Field of View) than would be possible without these elements. This is advantageous because aiming of system 150 is improved. In the prior art, communication systems using light must first (1) orient the spacecraft for course pointing, and then (2) move the transmitter and/or receiver system by manipulating a complex gimbal system upon which the transmitter or receiver is mounted, and (3) utilize a fast steering mirror to carry out fine adjustments over time. The disclosure enables steps (2) and (3) to be avoided, particularly as angle α can be one degree or more, and as multiple laser/photodetector subassemblies 190 are provided, as described further elsewhere herein. Hence hardware such as gimbal systems, fast steering mirrors and vibration isolation platforms can be eliminated, resulting in a more compact, static system. A typical prior art system uses mechanically moving parts, whereas the disclosure provides a system 100 that is mechanically static. In addition, prior art systems respond more slowly to the laser beams changing direction because the reaction relies on mechanically moving parts, whereas a system 100 of the disclosure is faster since it relies only on electronics for alignment.

In an embodiment, micro-lens array 170 includes lenses with different focal lengths, in order to accommodate various distances from panel array 186 to a vertex of lens system 152. In addition, or alternatively, micro-lens array 170 can be mechanically repositionable to change its focal length, for example to compensate for more or less divergence of the outbound laser beam 194, or for other changes in design or deployment.

FIG. 11 depicts a mechanical component or actuator 174 for changing a distance between lenses 156 and 158; actuator 176 for changing a distance between telescope 154 and lens assembly 152; and actuator 178 for changing a distance between lens assembly 152 and panel array 186. A system 100/100A of the disclosure can omit all or include any one or more of actuators 174, 176, and 178. Actuators can be fabricated using any known or hereinafter developed method, including using for example an electrical motor or a shape memory alloy connector between the foregoing stated components.

In an example embodiment of the disclosure, seven VCSELs in a hexagonal pattern can be provided in array 186, although lesser or greater numbers can be used, including thousands of VCSELs, and in various alternative patterns. A wavelength of 850 nm can be used, although other wavelengths can be selected, based upon power requirements, human safety, and the distance over which communication must be carried out. Current commercially available VCSELs include those with a wavelength of 850 nm, an aperture radius of 2 μm and a laser beam divergence angle of 8° (half angle). It is expected that the disclosure can be carried out with VCSELs having these parameters, and it may be convenient and cost effective to use them. However, other wavelengths, apertures and divergence angles can be used, as would be understood by one skilled in the art in light of the disclosure.

A system of the disclosure does not pose any serious electrical safety issues, as microelectronic components are used that operate at voltages below 10V, and with currents below 100 mA. The laser radiation received at the ground terminal will not pose a danger to human health because of the low transmitted power. In addition, VCSELs can be used for laser 194 which can operate in the 1550 nm wavelength range, where the maximum permitted exposure level for the eyes is orders of magnitudes higher than at other wavelengths. This simplifies testing of the devices on the ground.

Example Computer System

Figure 8:
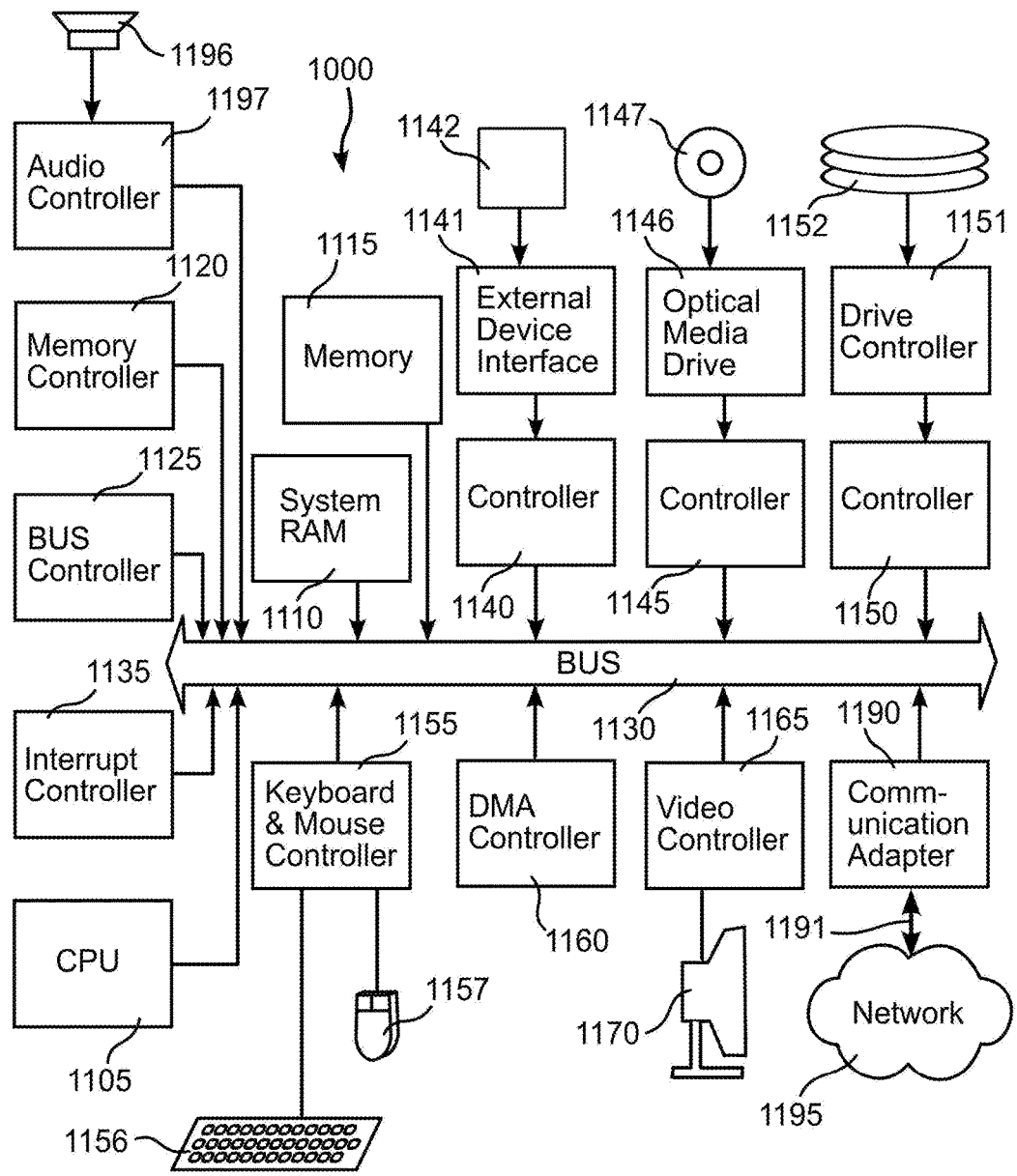
FIG. 8 depicts an example computer system, some or all of which can be used to carry out various aspects of the disclosure.

FIG. 8 illustrates a system architecture for a computer system 1000 which can process data at a ground station, or within an orbiting or space based object, in accordance with the disclosure. All or only portions of such system can be used, as needed. The exemplary computer system of FIG. 8 is for descriptive purposes only. Although the description may refer to terms commonly used in describing particular computer systems, the description and concepts equally apply to other systems, including systems having architectures dissimilar to FIG. 8. System 1000 can be an embedded system.

Computer system 1000 includes at least one central processing unit (CPU) 1105, or server, which may be implemented with a conventional microprocessor, a random-access memory (RAM) 1110 for temporary storage of information, and a read only memory (ROM) 1115 for permanent storage of information. A memory controller 1120 is provided for controlling RAM 1110.

A bus 1130 interconnects the components of computer system 1000. A bus controller 1125 is provided for controlling bus 1130. An interrupt controller 1135 is used for receiving and processing various interrupt signals from the system components.

Mass storage may be provided by diskette 1142, CD or DVD ROM 1147, flash or rotating hard disk drive 1152. Data and software may be exchanged with computer system 1000 via removable media such as diskette 1142 and CD ROM 1147. Diskette 1142 is insertable into diskette drive 1141 which is, in turn, connected to bus 1030 by a controller 1140. Similarly, CD ROM 1147 is insertable into CD ROM drive 1146 which is, in turn, connected to bus 1130 by controller 1145. Hard disk 1152 is part of a fixed disk drive 1151 which is connected to bus 1130 by controller 1150. It should be understood that other storage, peripheral, and computer processing means may be developed in the future, which may advantageously be used with the disclosure.

User input to computer system 1000 may be provided by a number of devices. For example, a keyboard 1156 and mouse 1157 are connected to bus 1130 by controller 1155. An audio transducer 1196, which may act as both a microphone and a speaker, is connected to bus 1130 by audio controller 1197, as illustrated. It will be obvious to those reasonably skilled in the art that other input devices, such as a pen and/or tablet, Personal Digital Assistant (PDA), mobile/cellular phone and other devices, may be connected to bus 1130 and an appropriate controller and software, as required. DMA controller 1160 is provided for performing direct memory access to RAM 1110. A visual display is generated by video controller 1165 which controls video display 1170. Computer system 1000 also includes a communications adapter 1190 which allows the system to be interconnected to a local area network (LAN) or a wide area network (WAN), schematically illustrated by bus 1191 and network 1195.

Operation of computer system 1000 is generally controlled and coordinated by operating system software, such as *nix, or a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 1105 coordinates the operation of the other elements of computer system 1000. The present disclosure may be implemented with any number of commercially available operating systems, including supercomputers and massively parallel processing systems.

One or more applications, such as an HTML page server, or a commercially available communication application, may execute under the control of the operating system, operable to convey information to a user.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

REFERENCE NUMBERS

| | |
|---|---|
| 100/100A | system |
| 150 | optical device |
| 152/152A | lens assembly/eyepiece |
| 164 | Plössl lens |
| 170 | micro-lens array |

-continued

| | |
|---|---|
| 172 | micro-lens |
| 180 | plane/planar surface |
| 186 | panel array |
| 190 | subassembly |
| 192 | photodetector |
| 194 | laser |
| 200 | signal/locking/inbound laser beam |
| 202 | modulated/data/outbound laser beam |
| 220 | ground terminal |
| 222 | Earth |
| 224 | space |
| 238 | rocket/launch vehicle |
| 240 | satellite |
| 1000+ | computer system |
| 1105 | computer processor |
| 1110 | RAM/storage |
| 1115 | ROM/storage |
| 1120 | memory controller |
| 1125 | bus controller |
| 1130 | bus |
| 1135 | interrupt controller |
| 1142 | CD/DVD disk/storage |
| 1147 | flash storage |
| 1152 | magnetic storage |
| 1141 | optical drive |
| 1151 | fixed disk drive |
| 1151 | controller |
| 1156 | keyboard |
| 1157 | mouse |
| 1120 | memory controller |
| 1125 | bus controller |
| 1130 | bus |
| 1135 | interrupt controller |
| 1142 | CD/DVD disk/storage |
| 1147 | flash storage |
| 1152 | magnetic storage |
| 1141 | optical drive |
| 1151 | fixed disk drive |
| 1151 | controller |
| 1156 | keyboard |
| 1157 | mouse |
| 1160 | DMA controller |
| 1165 | video controller |
| 1170 | video display |
| 1190 | communications adapter |
| 1191 | bus |
| 1195 | network |
| 1196 | audio transducer |
| 1197 | audio controller |

The invention claimed is:

1. A method of communicating using light between first and second separated objects, comprising:
receiving laser light beams transmitted from the first object in a telescopic lens assembly of a device connected to the second object, the telescopic lens assembly positioned in front of a cat's-eye lens of the device to thereby transmit the received light to the cat's-eye lens, the light received at any of a plurality of angles and output through the cat's-eye lens to a focal plane of the cat's-eye lens, the position of the light beams upon the focal plane of the cat's-eye lens corresponding to the angle of the beam received at the cat's-eye lens, the device further including
a plurality of lasers distributed upon a supporting surface connected to the cat's eye lens to be positioned along the focal plane, the plurality of lasers thereby distributed along the focal plane, and
a plurality of photodetectors distributed upon the supporting surface with individual ones of the plurality of photodetectors positioned proximate individual lasers, the photodetectors configured to detect the received light beams upon the focal plane;
using a processor to
receive a signal from individual ones of the plurality of photodetectors corresponding to light beams detected,
selectively signal individual ones of the plurality of lasers positioned proximate the individual ones of the photodetectors detecting light, the signal operative to cause the selected lasers to transmit light encoding data through the cat's-eye lens and telescopic lens in a direction of the first object at an angle corresponding to a location upon the focal plane of the individual ones of the plurality of lasers transmitting the light encoding data.

2. The method of claim 1, wherein individual ones of the plurality of lasers are VCSEL type lasers.

3. The method of claim 1, wherein the cat's eye lens is a telecentric lens.

4. The method of claim 1, further including multiplexing the light encoding data emitted from a plurality of selected lasers to form a common data stream.

5. The method of claim 1, wherein the telescopic lens assembly is one of a refractive and reflective type telescopic lens assembly.

6. The method of claim 1, further including encoding the light encoded data at a rate of more than about 1 GHz.

7. The method of claim 1, wherein one of the first and second objects is a satellite.

8. The method of claim 1, wherein the cat's-eye lens includes a Plössl type lens assembly.

9. The method of claim 8, wherein a micro-lens assembly is positioned between the cat's-eye lens and the focal plane.

10. The method of claim 9, wherein the micro-lens assembly directs light from individual ones of the plurality of lens to the vertex of the cat's-eye lens.

11. The method of claim 1, wherein the photodetectors and the lasers are provided in the form of a manufactured wafer having at least 7 lasers.

12. The method of claim 1, wherein the plurality of lasers, the cat's-eye lens, and the telescope are cooperative to transmit laser light out of the telescope at an angle between 0° and at least 1°.

13. A method of communicating using light between first and second separated objects separated by an astronomical distance being at least as great as the distance from the surface of Earth to LEO, the distance between two satellites, or the distance from Earth to a spacecraft in flight, comprising:
receiving laser light beams transmitted from the first object in a telescopic lens assembly of a device connected to the second object, the telescopic lens assembly positioned in front of a cat's-eye lens of the device to thereby transmit the received light to the cat's-eye lens, the light received at any of a plurality of angles and output through the cat's-eye lens to a focal plane of the cat's-eye lens, the position of the light beams upon the focal plane of the cat's-eye lens corresponding to the angle of the beam received at the cat's-eye lens, the device further including
a plurality of lasers and photodetectors distributed upon a supporting surface connected to the cat's eye lens to be positioned along the focal plane, the plurality of lasers and photodetectors thereby distributed along the focal plane, and
using a processor to
receive a signal from individual ones of the plurality of photodetectors corresponding to light beams detected, selectively signal individual ones of the plurality of lasers positioned proximate the individual ones of the photodetectors detecting light, the signal operative to cause the selected lasers to transmit light encoding data through the cat's-eye lens and telescopic lens in a direction of the first object at an angle corresponding to a location upon the focal plane of the individual ones of the plurality of lasers transmitting the light encoding data.

14. The method of claim 13, wherein the cat's eye lens is configured to receive laser light beams transmitted from the Earth to Space.

15. The method of claim 13, wherein at least one of the first and second objects is a satellite.

16. The method of claim 13, wherein the cat's-eye lens is a Plössl type lens assembly.

17. The method of claim 13, wherein individual ones of the plurality of lasers are VCSEL type lasers.

18. The method of claim 13, wherein the cat's-eye lens has a FOV of at least 42°.

19. A device for communicating using light between first and second separated objects, comprising:
   a satellite; and
   a device affixed to the satellite, including:
      a telescopic lens assembly;
      a cat's-eye lens positioned behind the telescopic lens assembly;
      a plurality of lasers distributed upon a supporting surface positioned along a focal plane of the cat's-eye lens; and
      a plurality of photodetectors distributed upon the supporting surface to position individual photodetectors upon the focal plane proximate individual lasers.

20. The device of claim 19, wherein the cat's eye lens includes at least one of a Plössl type lens assembly and a holographic optical element exhibiting the optical characteristics of a Plössl type lens assembly.

* * * * *